United States Patent [19]

Ono

[11] Patent Number: 4,470,618
[45] Date of Patent: Sep. 11, 1984

[54] ADJUSTABLE SEAT BELT ANCHORAGE
[75] Inventor: Katsuyasu Ono, Fujisawa, Japan
[73] Assignee: NSK-Warner K.K., Japan
[21] Appl. No.: 393,035
[22] Filed: Jun. 28, 1982
[30] Foreign Application Priority Data Aug. 7, 1981 [JP] Japan .......................... 56-117334[U]

[51] Int. Cl.³ ............................................ B60R 21/10
[52] U.S. Cl. ................................... 280/808; 297/483; 297/486
[58] Field of Search ............... 280/806, 808; 297/476, 297/479, 480, 482, 483, 486; 296/483, 486

[56] References Cited
U.S. PATENT DOCUMENTS

| 4,135,737 | 1/1979 | Scholz et al. | 280/808 |
| 4,225,185 | 9/1980 | Krezok | 280/801 |
| 4,247,131 | 1/1981 | Fiehl et al. | 280/808 |
| 4,306,735 | 12/1981 | Pfeiffer et al. | 280/808 |
| 4,311,323 | 1/1982 | Provensal | 280/808 |
| 4,398,751 | 8/1983 | Wahlmann | 280/802 |

Primary Examiner—Richard A. Bertsch
Attorney, Agent, or Firm—McGlew and Tuttle

[57] ABSTRACT

Disclosed herein is an adjustable seat belt anchorage comprising a guide member having a plurality of interlocking portions, a slider having a portion of such configurations as a channel with flanges inwardly extending along both free edges thereof and provided displaceably with respect to the guide member, a latch piece provided on the slider in such a way that the latch piece is displaceable between an interlocking position and a non-interlocking position, means for normally urging the latch piece toward the interlocking position, a release member supported on the slider and, when operated, capable of shifting the latch piece to the non-interlocking position, and an anchor plate attached to the slider and adapted to support a shoulder webbing either at its free end or at an intermediate portion thereof. Owing to the above construction, the adjustable seat belt anchorage can withstand loads to be applied thereto through the anchor plate, without undergoing deformation and permits a simple and fast adjustment of its height.

7 Claims, 4 Drawing Figures

ADJUSTABLE SEAT BELT ANCHORAGE

BACKGROUND OF THE INVENTION (1) Field of the Invention:

This invention relates to an anchorage for vehicle seat belts, and more particularly, to an adjustable seat belt anchorage for automobiles.

(2) Description of the Prior Art:

Vehicles of today are equipped with seat belts to protect their passengers safely in the event of an emergency such as collision. It is recommended to wear such seat belts, particularly when driving on freeways. It is general to adopt a three-point support type seat belt especially for the driver or passenger in a front seat so as to simultaneously restrain his upper body and lap area from the viewpoint of avoiding any secondary collision against interior structural parts of the vehicle.

Since the physical constitution of each driver or passenger who wears a seat belt is different to a considerable extent, it is certainly preferred to permit, from the standpoint of safety, not only an adjustment of the length of a webbing but also an adjustment of the mounting position of an anchorage which supports the webbing(notably, an upper anchorage for the shoulder webbing). Otherwise, the shoulder webbing may extend over the face or neck of a passenger or driver(-hereinafter called "a passenger" for simplicity) if the upper anchorage for the shoulder webbing is positioned too high. On the other hand, the shoulder webbing may pass over the arm of the passenger if the location of the upper anchorage is too low. In each of the above cases, there is a danger that the passenger may not be fully protected in the event of an emergency.

In view of such problems, a variety of adjustable anchorages have heretofore been proposed. For example, U.S. Pat. No. 4,135,737 issued June 23, 1979 to Hansj UMl/u/ ergen Scholz et al and assigned to Daimler-Benz Aktiengesellschaft may be referred to. When a seat is shifted forwardly or rearwardly, its corresponding upper anchorage is automatically displaced downwardly or upwardly owing to the provision of a Bowden cable or the like transmission means. The linkage between the seat and its corresponding upper anchorage may be advantageous or at least convenient, because the position of the upper anchorage is automatically determined when the seat position is set. However, if a passenger has an excessively longer or shorter legs relative to his upper body, an adjustment of the seat position may not bring the shoulder webbing to a right position and it may still be desirous to readjust the height of the upper anchorage. In the above U.S. patent specification, the upper anchorage is normally unlocked. Namely, the locking of the upper anchorage is carried through a series of chain action. A certain time period is thus required until the webbing can effectively hold the passenger. Furthermore, the above anchorage includes rather many moving parts and thus appears to be susceptible of developing malfunctions. British patent specification No. 1,486,974 published Sept. 28, 1977 and naming Chrysler United Kingdom Limited as its applicant discloses an adjustable upper anchorage. The height of the upper anchorage may be adjusted by first pressing the head of a post against the force of a compression spring and then sliding the post up or down. In other words, it is necessary to continuously apply a force onto the head of the post until the post is moved to a suitable height. The compression spring is serving to lock the upper anchorage at a suitable position. Thus, it is required to exert a considerable degree of expansion force in order to ensure the locking of the upper anchorage. However, such a strong compression spring requires a strong power for permitting a height adjustment of the upper anchorage. Another example of prior art adjustable anchorages is found in German Offenlegungsschrift No. 29 32 505 laid open Feb.12, 1981 and naming Daimler-Benz AG as its applicant. In this anchorage, the teeth of a detent member are supported by the lower edges of either one of pairs of shallow recesses in an anchor plate. In view of a possible great impact to be exerted between the teeth and the lower edges of the recesses as well as the rather small contact areas between the teeth and the lower edges of the recesses, it seems to be necessary to construct them with a strong material. In addition, the anchor plate defines a rather wide slot. Thus, it seems to be rather weak unless it is made of a strong and thick material.

In prior art seat belt anchorages including the above-mentioned specific examples, the rigidity of each anchor plate is sacrificed in order to incorporate a height adjustable mechanism therein. Accordingly, there seemed to be some room for an improvement to such prior art seat belt anchorages.

SUMMARY OF THE INVENTION

With the foregoing in view, an object of this invention is to provide an adjustable anchorage which is easy to operate and has a high degree of rigidity so as to ensure a sure locking at a given position even in the event of an emergency.

As a result of the present inventor's research, it has been found that the above object of this invention can be achieved by supporting a latch piece on a slider, which supports an anchor plate, in an engageable fashion with an interlocking portion of a guide member, operating the latch piece through a release member, and forming the slider into such configurations as a channel with flanges inwardly extending along both free edges thereof, in other words, forming the slider to have a square C-shaped transverse cross-section.

In one aspect of this invention, there is thus provided an adjustable seat belt anchorage comprising:

a guide member having a plurality of interlocking portions and adapted to be fixedly mounted on an automobile body;

a slider having a portion of such configurations as a channel with flanges inwardly extending along both free edges thereof and provided displaceably with respect to said guide member while being guided by said guide member;

a latch piece provided on said slider in such a way that said latch piece is displaceable between an interlocking position where said latch piece is brought into engagement with either one of said interlocking portions of said guide member and a non-interlocking position where said latch piece is unengaged with any one of said interlocking portions;

means for normally urging said latch piece toward said interlocking position;

a release member supported on said slider and, when operated, capable of shifting said latch piece to the non-interlocking position; and an anchor plate attached to said slider and adapted to support a shoulder webbing either at its free end of at an intermediate portion thereof.

In the above seat belt anchorage according to this invention, the slider to which the anchor plate is attached is formed into such configurations as the channel with flanges inwardly extending along both free edges thereof and supports displaceably the latch piece which is engageable with the interlocking portions of the guide member to be mounted on a vehicle body, and the latch piece is operable by the release member. Accordingly, the present invention can bring about such effects that the anchorage can withstand loads without undergoing deformation and permits a simple and fast adjustment of its height.

The above and other objects, features and advantages of the present invention will become more apparent from the following description and the appended claims, taken in conjunction with the accompanying drawings.

DETAILED DESCRIPTION OF THE INVENTION AND PREFERRED EMBODIMENTS

Figure 1:
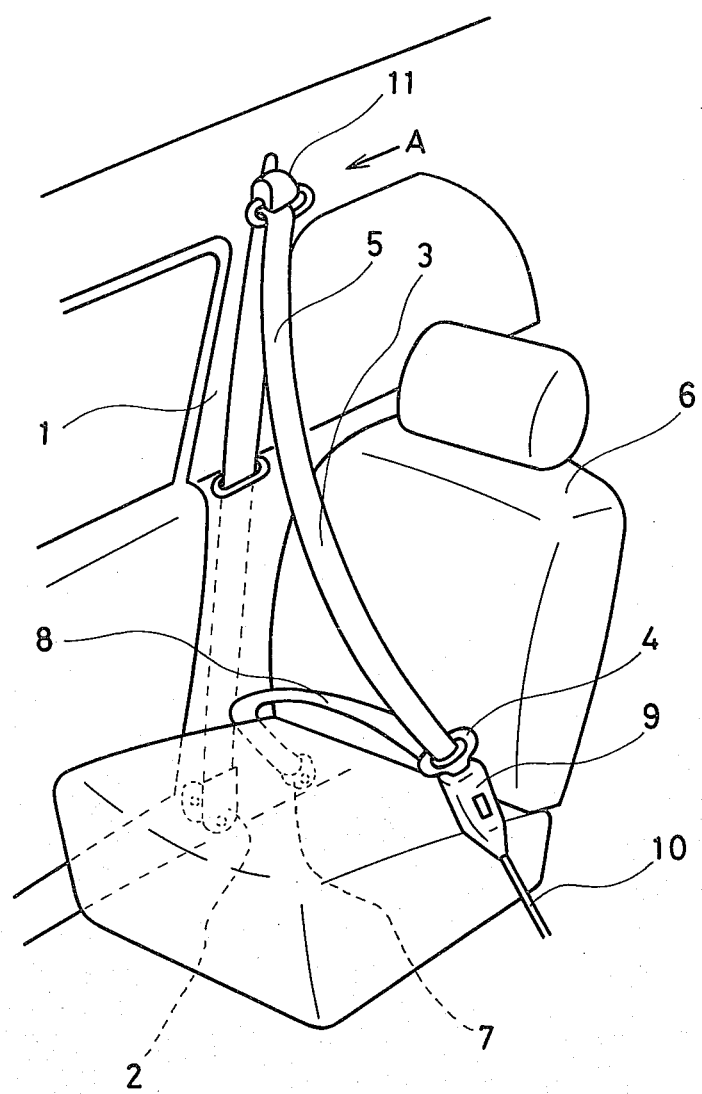
FIG. 1 is a schematic illustration of a seat belt incorporating a seat belt anchorage according to this invention.

A lap-shoulder continuous webbing 3, one end portion of which webbing 3 is received in a retractor 2 fixedly provided at a lower location within a center pillar 1, is formed of a shoulder webbing 5 which extends through an upper anchorage 11 and is deflected to a tongue 4 and a lap webbing 8 which is deflected from the tongue 4 and sewed at the other end thereof on a lower anchorage 7 fixely provided at the outer side of a seat 6. At the inner side of the seat 6, a buckle 9 is provided through a flexible support 10. The buckle 9 is detachably fastened with the tongue 4.

Figure 2:
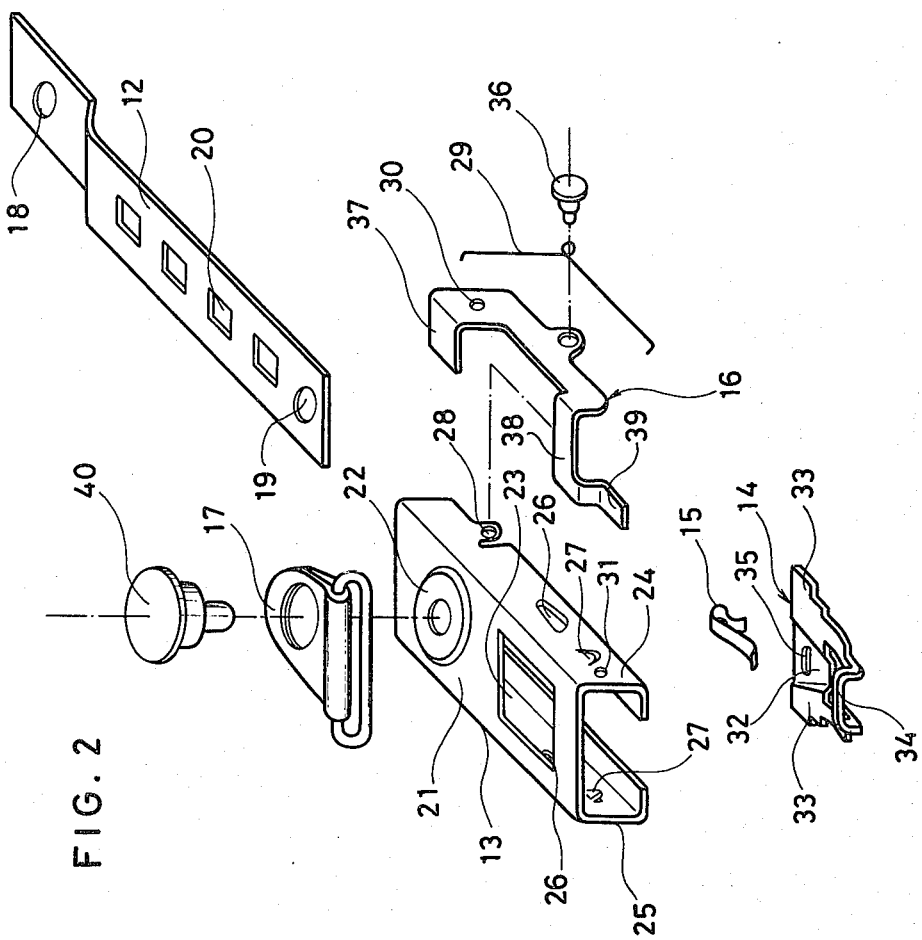
FIG. 2 is a perspective and exploded view of a seat belt anchorage according to one embodiment of this invention.
Figure 3:
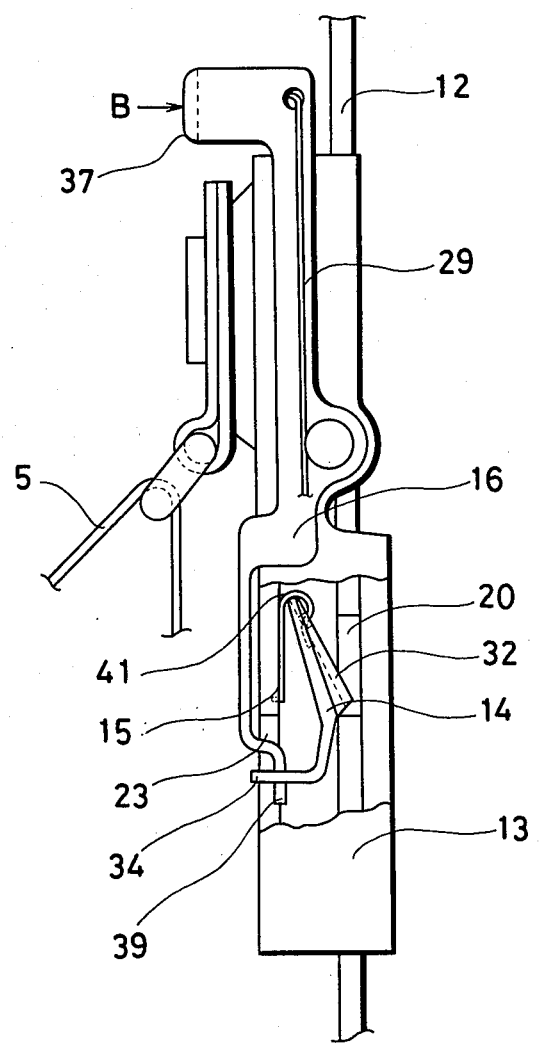
FIG. 3 is a side elevation of the seat belt anchorage of FIG. 2, seen in the direction of A in FIG. 1.

The upper anchorage 11 according to this invention is adapted to support the shoulder webbing 5 of such a seat belt at an intermediate portion thereof. Referring now to FIGS. 2 and 3, the upper anchorage 11 is principally formed of a guide member 12 mounted on the center pillar 1, a slider 13 slidable up and down while being guided by the guide memeber 12, a latch piece 14 pivotally supported on the slider 13, latch spring 15 urging the latch piece 14, a release lever 16 supported on the slider 13, and an anchor plate 17 provided on the slider 13.

The guide member 12 defines mounting bores 18, 19 respectively at its upper and lower extremities and fixedly mounted by means of bolts at an upper location on the center pillar 1. Between both mounting bores 18, 19, there are formed a plurality of openings 20 which serve as interlocking portions.

The slider 13 is provided as if it encloses the guide member 12. Except for a portion where the anchor palte 17 is mounted, the remaining portion of the slider 13 is formed into a channel with flanges inwardly extending along both free edges thereof. On a front wall 21 of the slider 13, there are formed a raised portion 22 for providing the anchor plate 17 thereon and a window 23 for connecting the latch piece 14 and release lever 16 together. Both side walls 24, 25 define respectively slots 26, 26 to receive and support the latch piece 14 and guide projections 27, 27 for guiding the slider 13 smoothly on the guide member 12. An attachment hole 28 is also formed in the right side wall 24 to attach the release lever 16 thereto.

The latch piece 14 has an interlocking projection 32 adapted to engage with either one of the openings 20, lugs 33, 33 which are losely inserted in the slots 26, 26 of the slider 13, and a bridge 34 extending below the interlocking projection 32. As apparent from FIG. 3, the bridge 34 is positioned in the window of the slider 13. The latch piece 14 is always urged counterclockwise, in other words, in a direction approaching the guide member 12 by means of a latch spring 15 inserted through a long slot 35 which is formed above the interlocking projection 32.

On the other hand, the release lever 16 is attached to the attachment hole 28 in the right side wall 24 of the slider 13 by means of a pin 36. The release lever 16 is always urged counterclockwise by means of a return spring 29 which is attached at its one end to a retainer opening 30 formed in the release lever 16 and at its the other end to another retainer opening 31 bored through the right side wall 24 of the slider 13.

An upper bent portion 37 of the release lever 16 is an operating part, which is operated by a finger or the like. The lower bent portion 38 extends above the window 23 of the slider 13, is once bent rearwardly there, and then extends downwardly to define a downward extension 39. Thus, the downward extension 39 assumes such a position as if it slips under the bridge 34 of the latch piece 14(see, FIG. 3). Although both release lever 16 and latch piece 14 are exerted with a counterclockwise urging force, they are not in contact to each other as long as the latch piece 14 assumes an interlocking position as illustrated in FIG. 3.

A raised portion 22 is formed at an upper part on the front wall of the slider 13. The anchor plate 17 is turnably attached on the raised portion 22 by means of a pin 40 so that the anchor plate 17 can turn about the pin 40.

Next, a description will be made as to how the above seat belt anchorage is used. A passenger sits on the seat 6 and, as shown in FIG. 1, inserts tongue 4 into the buckle 9 to wear the lap-shoulder continuous webbing 3. Here, it is not necessary to adjust the height of the upper anchorage 11 if the shoulder webbing 5 passes over the right shoulder of the passenger, as the shoulder webbing has already been in a good restraining position.

However, if the shoulder webbing 5 passes over the face or neck of the passenger, it is necessary to displace the upper anchorage 11 downwardly. On the other hand, it is required to adjust the upper anchorage 11 to an upper location if the shoulder webbing 5 extends over the right arm of the passenger. For making such an adjustment, the release lever 16 turns in the clockwise direction against the urging force of the return spring 29 and eventually abuts against the bridge 34 of the latch piece 14 when the operating portion 37 of the release lever 16 is pushed in the direction indicated by the arrow B. When the latch piece 14 is further turned clockwise, it turns clockwise about its upper edge 41 and the interlocking projection 32 is released from the opening 20 of the guide member 12 and caused to move to a non-interlocking position. While maintaining this state, the slider is moved upwardly or downwardly and the depression force to the operating portion 37 is released when the shoulder webbing 5 assumes a position right over the right shoulder of the passenger. Then, the latch piece 14 is turned in a direction toward the guide member 12 by virtue of the urging force of the latch spring 15 and brought into engagement with the nearest opening 20. The above operation is carried out by shifting the slider 13 while pressing the operating portion 37 of the release lever 16. Thus, the height of the upper anchorage 11 can be adjusted readily in a short time period.

In the event of an emergency, any further paying-off of the lap-shoulder continuous webbing 3 is impeded by a method known per se in the art owing to an actuation of an emergency locking mechanism built in the retractor 2. Here, in order to protect the passenger who is about to move due to an inertia force, a large tensile force is developed in the webbing 3, which tensile force is also transferred to the upper anchorage 11 supporting the webbing 3. The upper anchorage 11 according to this invention can satisfactorily withstand such a high load because, in the present embodiment, the lower portion of the slider 13 is formed into a channel with flanges extending inwardly along both free edges thereof while its upper portion to which the anchor plate 17 is secured is formed into a simple channel.

Figure 4:
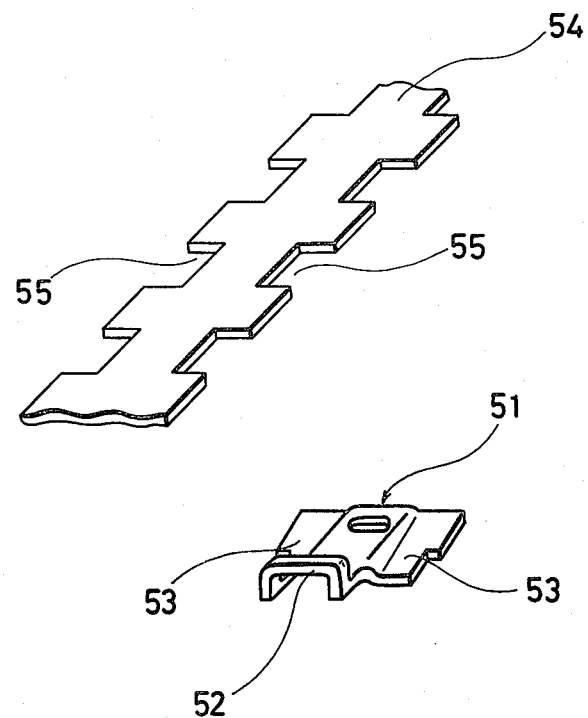
FIG. 4 is a fragmentary perspective view of a seat belt anchorage according to another embodiment of this invention.

The second embodiment of this invention will now be described, in which the configurations of the latch piece and, correspondingly, the configurations of the guide member have been changed from those of the first embodiment. FIG. 4 is a perspective view showing only those subjected to modifications. A latch piece 51 includes interlocking lugs 53, 53 at both sides of the bridge 52. Corresponding to the above changes to the latch piece, its corresponding guide member 54 defines a plurality of indentations 55 along both sides thereof. The indentations 55 in one side of the guide member 54 are laterally aliged with their corresponding indentations 55 formed in the other side of the guide member 54. Other parts or members are identical to those employed in the first embodiment and their detailed description will be omitted. Needless to say, the second embodiment can bring about the same effects as the first embodiment.

In the above embodiments, the description has been made on seat belts of such a type that shoulder webbings extend at their intermediate portions through their corresponding anchor plates and are supported there. Similar anchorages may obviously be used for other seat belts of such a type that shoulder webbings are fixedly secured to their corresponding anchor plates at their free ends.

Having now fully described the invention, it will be apparent to one or ordinary skill in the art that many changes and modifications can be made thereto without departing from the spirit or scope of the invention as set forth herein.

What is claimed is:

1. An adjustable seat belt anchorage comprising:
    a guide member having a plurality of interlocking portions and adapted to be fixedly mounted on an automobile body;
    a slider having a portion of such configurations as a channel with flanges inwardly extending along both free edges thereof and provided displaceably with respect to said guide member while being guided by said guide member;
    a latch piece provided on said slider in such a way that said latch piece is displaceable between an interlocking position where said latch piece is brought into engagement with either one of said interlocking portions of said guide member and a non-interlocking position where said latch piece is unengaged with any one of said interlocking portions;
    means for normally urging said latch piece toward said interlocking position;
    a release member supported on said slider and, when operated, capable of shifting said latch piece to the non-interlocking position; and
    an anchor plate attached to said slider and adapted to support a shoulder webbing either at its free end or at an intermediate portion thereof.

2. The adjustable seat belt anchorage as claimed in claim 1, wherein said guide member defines, as said interlocking portions, mutually-spaced openings therethrough.

3. The adjustable seat belt anchorage as claimed in claim 1, wherein said guide member defines, as said interlocking portions, mutually-spaced indentations along both longitudinal edges thereof.

4. An adjustable seat belt anchorage comprising:
    a guide member having a plurality of interlocking portions and adapted to be fixedly mounted on an automobile body;
    a slider provided displaceably with respect to said guide member while being guided by said guide member;
    a latch piece provided on said slider in such a way that said latch piece is displaceable between an interlocking position where said latch piece is brought into engagement with either one of said interlocking portions of said guide member and a non-interlocking position where said latch piece is unengaged with any of said interlocking portions;
    means for normally urging said latch piece toward said interlocking position;
    a release member supported on said slider and, when operated, capable of shifting said latch piece to the non-interlocking position; and
    an anchor plate attached to said slider and adapted to support a shoulder webbing either at its free end or at an intermediate portion thereof.

5. An adjustable seat belt anchorage as claimed in claim 4, wherein said slider has a channel portion with flanges extending inwardly along both free edges thereof and provided displaceable with respect to said guide member while being guided by said guide member.

6. An adjustable seat belt anchorage as claimed in claim 4, wherein said guide member defines, as said interlocking portions, mutually-spaced openings therethrough.

7. An adjustable seat belt anchorage, as claimed in claim 4, wherein said guide member defines, as said interlocking portions, mutually-spaced indentations along both longitudinal edges thereof.

* * * * *